United States Patent
Ochs

(10) Patent No.: US 10,599,375 B2
(45) Date of Patent: Mar. 24, 2020

(54) METHODS, SYSTEMS AND DEVICES FOR AUTOMATED COST BASED COLOR PROFILING OF INKJET PRINTERS

(71) Applicant: Xerox Corporation, Norwalk, CT (US)

(72) Inventor: Matthew J. Ochs, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/011,763

(22) Filed: Jun. 19, 2018

(65) Prior Publication Data

US 2019/0384550 A1   Dec. 19, 2019

(51) Int. Cl.

| | |
|---|---|
| G06F 3/12 | (2006.01) |
| G01J 3/46 | (2006.01) |
| G03G 15/00 | (2006.01) |
| G06K 15/02 | (2006.01) |
| H04N 1/00 | (2006.01) |
| H04N 1/60 | (2006.01) |
| G06Q 30/02 | (2012.01) |
| G06Q 20/40 | (2012.01) |

(52) U.S. Cl.
CPC ............. *G06F 3/1256* (2013.01); *G01J 3/46* (2013.01); *G06F 3/1208* (2013.01); *G06F 3/1257* (2013.01); *G03G 15/5058* (2013.01); *G06K 15/026* (2013.01); *G06Q 20/40* (2013.01); *G06Q 30/0283* (2013.01); *H04N 1/00031* (2013.01); *H04N 1/00034* (2013.01); *H04N 1/00045* (2013.01); *H04N 1/00087* (2013.01); *H04N 1/605* (2013.01); *H04N 1/6055* (2013.01); *H04N 2201/04793* (2013.01)

(58) Field of Classification Search
None
See application file for complete search history.

(56) References Cited

U.S. PATENT DOCUMENTS

| | | | | |
|---|---|---|---|---|
| 8,508,786 | B2* | 8/2013 | Nagarajan | H04N 1/00002 358/1.13 |
| 2009/0296085 | A1* | 12/2009 | Mestha | G01J 3/02 356/319 |
| 2011/0141497 | A1* | 6/2011 | Willamowski | H04N 1/00408 358/1.9 |
| 2012/0183315 | A1* | 7/2012 | Fujiwara | G03G 15/5041 399/49 |
| 2013/0321514 | A1* | 12/2013 | Pous | B41J 29/393 347/19 |
| 2013/0321827 | A1* | 12/2013 | Liebelt | H04N 1/60 358/1.9 |
| 2014/0255052 | A1* | 9/2014 | Fujiwara | G03G 15/5058 399/49 |
| 2014/0268191 | A1* | 9/2014 | Lin | G03G 15/5062 358/1.9 |
| 2016/0019015 | A1* | 1/2016 | Hirasawa | G06F 3/1205 358/2.1 |
| 2017/0239957 | A1* | 8/2017 | Ochs | G01J 5/041 |

* cited by examiner

Primary Examiner — Miya J Williams
(74) Attorney, Agent, or Firm — Fay Sharpe LLP

(57) ABSTRACT

A system, device and method for managing colors of a color printer in accordance with predetermined ink usages and cost objectives. Profiles comprising a corresponding set of job parameters are collected having an ink usage that satisfies a predetermined cost objective for the print job. Sheets are printed out in accordance with these acceptable profiles for proofing by a customer for image quality and selection of a profile to be used for the print job.

10 Claims, 4 Drawing Sheets

METHODS, SYSTEMS AND DEVICES FOR AUTOMATED COST BASED COLOR PROFILING OF INKJET PRINTERS

TECHNICAL FIELD

The presently disclosed embodiments are directed to inkjet printers wherein a variety of printing parameters are adjustable for varying print cost and image quality.

BACKGROUND

Adjusting and setting the variable parameters for an aqueous inkjet printing system is a customary part of the process in order to accommodate the competing interests of image quality versus cost. A particular set of selected parameters is often referred to as a print job profile and any system can have numerous executable profiles depending upon whether the operator of the system wishes to prioritize high-quality imaging or minimize cost. Typical of such parameters is paper type, drop size and resolution. An important parameter affecting job cost is ink usage. Different customers for a particular printing system will often desire options for a different parameter profiles depending upon the print job at hand. Setting a particular profile often involves third-party profiling tools and a lot of trial and error, which is of course undesirable in terms of efficiency. Often systems are set to one profile for a customer, which is then delivered to that customer, while providing no flexibility in cost/quality.

Aqueous inkjet profiling is a relatively difficult problem to automate. The fact that image quality and therefore profiles change with every paper and edit setting is the fundamental basis that makes such profiling hard to do. There is thus a need for improved inkjet printer technology for efficiently managing system parameters, such as color management control which relates levels of image quality to costs and ink usage. Such a system would address a root concern of commercial printers which would typically approach profiling with a cost goal in mind so to be able to bid work with appropriate margin. Instead of providing a profile with a set cost with the expectancy and hope that the customer will accept image quality, such a system will give the printer and customer the opportunity to pick an image quality they like with the knowledge that it will meet their run cost goals.

SUMMARY

According to aspects illustrated herein, there is provided systems devices and methods for managing operating parameters of a color printer to determine profiles which relate image quality and run cost. More particularly, one disclosed feature of the embodiments is a printer processing control system for controlling print image quality comprising a user input for defining a predetermined print cost for a print job and a desired image quality therefor. A profiling tool generates a plurality of job profiles having a variety of job print costs and corresponding image quality. An estimating tool validates that each one of the plurality of job profiles has a consistency with the predetermined print cost and desired image quality. A print processor selects one of the plurality of the job profiles having a maximum consistency with a predetermined print cost and desired image quality. This system can print color patches of test sheets of paper associated with the print job, determine spectral data of the color patches using a spectrophotometer, determine measurements based on the spectral data, determine that an ink usage cost is equal to or within the range of measurements associated with the cost and then let the user select the test patches determined to be most desirable by the user.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
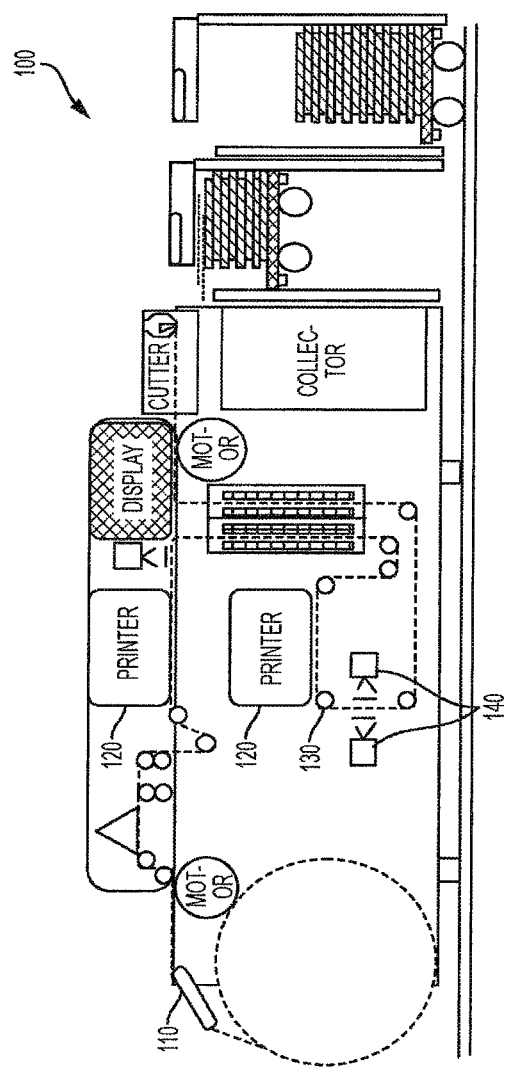
FIG. 1 is a diagram depicting an example inkjet printer system schematic, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Generally, inkjet printer systems can be configured using parameters, such as color management controls. Examples of color management controls can include, but are not limited to, total area coverage, ink limits, gray component replacement, color contrast, paper type, etc.

In some embodiments, parameters, including color management controls, can be stored on an inkjet printer system as paper profiles or International Color Consortium (ICC) profiles in software coding. For example, an inkjet printer system can be purchased preloaded with three paper profiles for three common types of printer paper (e.g., untreated/uncoated, treated/uncoated, and treated/coated). Additionally, in some implementations, additional paper profiles can be added to the inkjet printer system after purchase.

In various embodiments, a paper profile can be designed to balance various printing factors, such as cost to print, quality of the printed output, water content in the printed output, amount of drying needed, etc.

In some embodiments, the inkjet printer system can include an inline Full Width Array (FWA) spectrophotometer, such as an FWA as described in U.S. Pat. No. 6,975,949, which is incorporated by reference in its entirety, and the system can send the printed test sheet to be scanned by the FWA. The FWA can determine spectral data based on the printed test sheet, which can be used to determine measurements, such as color brightness, color gamut volumes, color contrast, ink showthrough, paper whiteness, etc., to determine whether the measurements are acceptable, and/or to determine a new or existing profile to associate with the job.

FIG. 1 is a diagram depicting an example inkjet printer system schematic, consistent with certain disclosed embodiments. FIG. 1 is intended merely for the purpose of illustration and is not intended to be limiting.

As depicted in FIG. 1, inkjet printer system 100 can include, for example, paper feed mechanism 110, inkjet printheads 120, and FWA 140. A sheet of paper can be feed into feed mechanism 110, and follow path 130 to inline inkjet printheads 120, then to inline FWA 140, and then can be output from the system. Accordingly, in some implementations, inkjet printer system 100 can be a closed system with at least the above-described components. Inkjet printer system 100 can, in further implementations, include other components, such as, for example, one or more motors, one or more cutting mechanisms, one or more stapling mechanisms, user input devices, display devices, etc.

Figure 4:
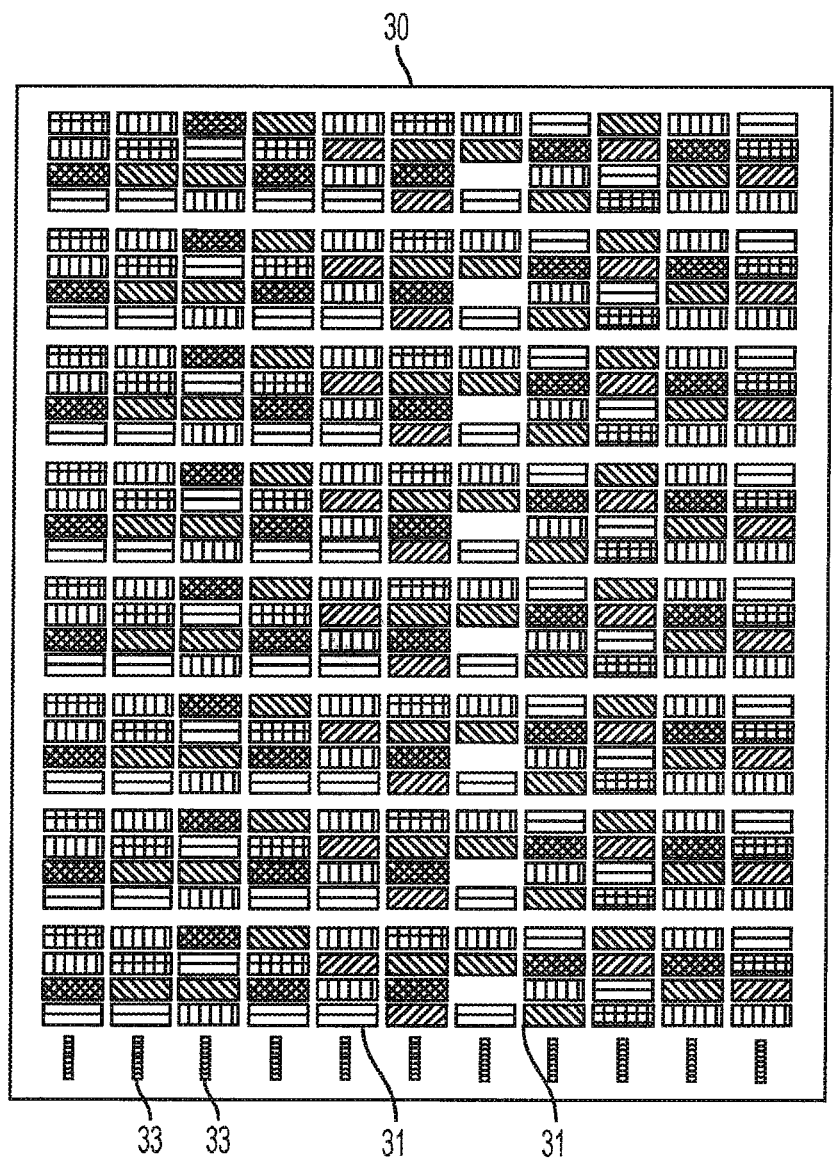
FIG. 4 is an example of a printed test sheet with multiple different colors of color patches, consistent with certain disclosed embodiments.

In some implementations, inkjet printer system 100 can, in response to the instruction, begin printing one or more test sheets with color patches using inkjet printheads 120. Example color patches are shown in FIG. 4 and described in further detail below.

In some embodiments, inkjet printheads 120 can use aqueous (water-based) ink.

In various embodiments, inkjet printheads 120 can be used to print test sheets by propelling droplets of ink onto the paper based on parameters (e.g., color management controls) of one or more profiles. A profile can define various parameters for use when printing a document.

In some embodiments, when an instruction is received to profile a print job, the inkjet printer system 100 can print test sheets using, for example, a testing profile (i.e., a job profile designed for printing test sheets), another type of pre-existing job profile, or manually entered parameters.

Inkjet printheads 120 can be, for example, thermal inkjet heads that use the thermal inkjet process to move drops of ink by using a pulse of current passed through a heating element that causes a rapid vaporization of the ink in the chamber and forms a vapor bubble, which causes a large pressure increase, propelling a droplet of ink onto the paper. Surface tension of the ink, the condensation, and a contraction of the vapor bubble pull a further charge of ink into the chamber through a narrow channel attached to an ink reservoir.

As an additional example, inkjet printheads 120 can be piezoelectric inkjet heads that, instead of a heating element, use a piezoelectric material in an ink-filled chamber behind the nozzles. When a voltage is applied, the piezoelectric material can change shape, which generates a pressure pulse in the fluid and can force a droplet of ink from a nozzle.

In some embodiments, inkjet printheads 120 can apply between zero and eight droplets of ink per dot, depending on an intended color of the dot and the parameters. The amount of droplets of ink per dot is a major factor in determination of cost and image quality per job.

Once a test sheet is printed, it can be scanned by FWA 140. FWA 140 can measure spectral data (as described in further detail in U.S. Pat. No. 6,975,949) to determine, for example, color brightness, color gamut volumes, color contrast, paper whiteness, etc. Additionally, in some embodiments, FWA 140 can measure both sides of the paper to also so determine a showthrough level of the ink (e.g., how much ink bleeds through the paper, if any) based on the spectral data. For example, as depicted in FIG. 1, FWA 140 can include sensors on both sides of the printed sheets as the sheets travel down path 130.

In some embodiments, inkjet printer system 100 can be a closed loop system. For example, inkjet printer system 100 can print a test sheet, using inkjet printheads 120, scan the test sheet, using FWA 140, and then use the data from the scanned test sheet as feedback to adjust parameters and print a subsequent test sheet and/or regular print jobs.

Figure 2:
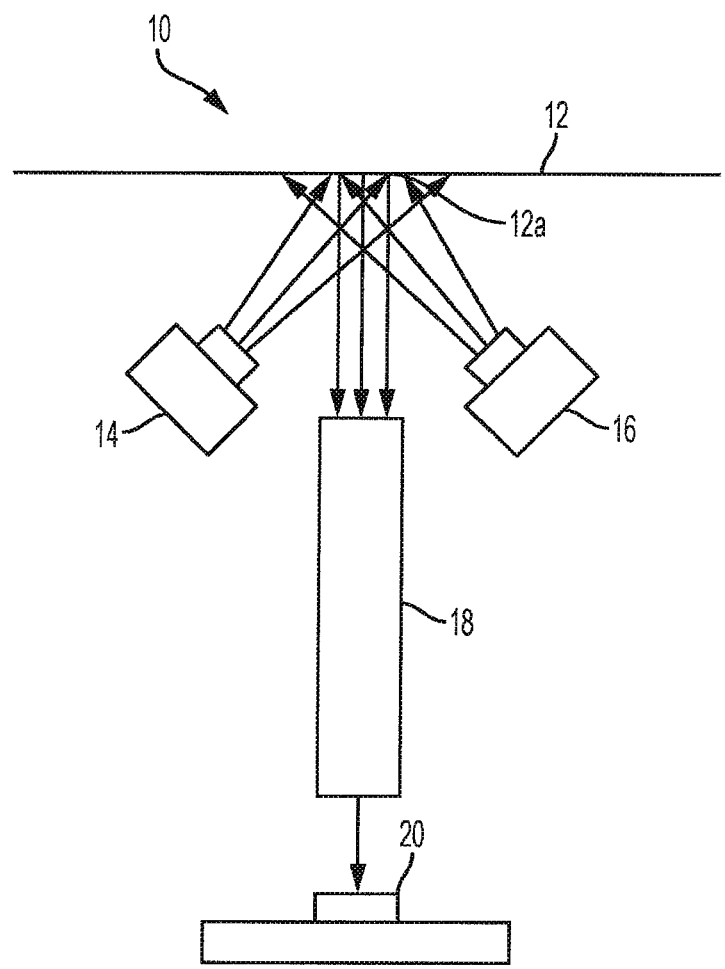
FIG. 2 is a diagram depicting a schematic side view of one example of an FWA spectrophotometer shown scanning a printed sheet in the output path of an inkjet printer system, consistent with certain disclosed embodiments.

FIG. 2 is a diagram depicting a schematic side view of one example of an FWA spectrophotometer shown scanning a printed sheet in the output path of an inkjet printer system, consistent with certain disclosed embodiments.

As depicted in FIG. 2, FWA spectrophotometer system 10 includes both LED arrays 14, 16 of an illumination system (which may be mounted on a single printed circuit board) oppositely oriented at about 45 degrees to a printed test sheet 12 they are both illuminating. Thus they allow perpendicular orientation, in between LED arrays 14 and 16, of a linear reflected light optical path from 12A to the imager array 20 through SELFOC lens 18.

Further details regarding measuring spectral data using an FWA spectrophotometer system can be found in U.S. Pat. No. 6,975,949, which is incorporated by reference.

Figure 3:
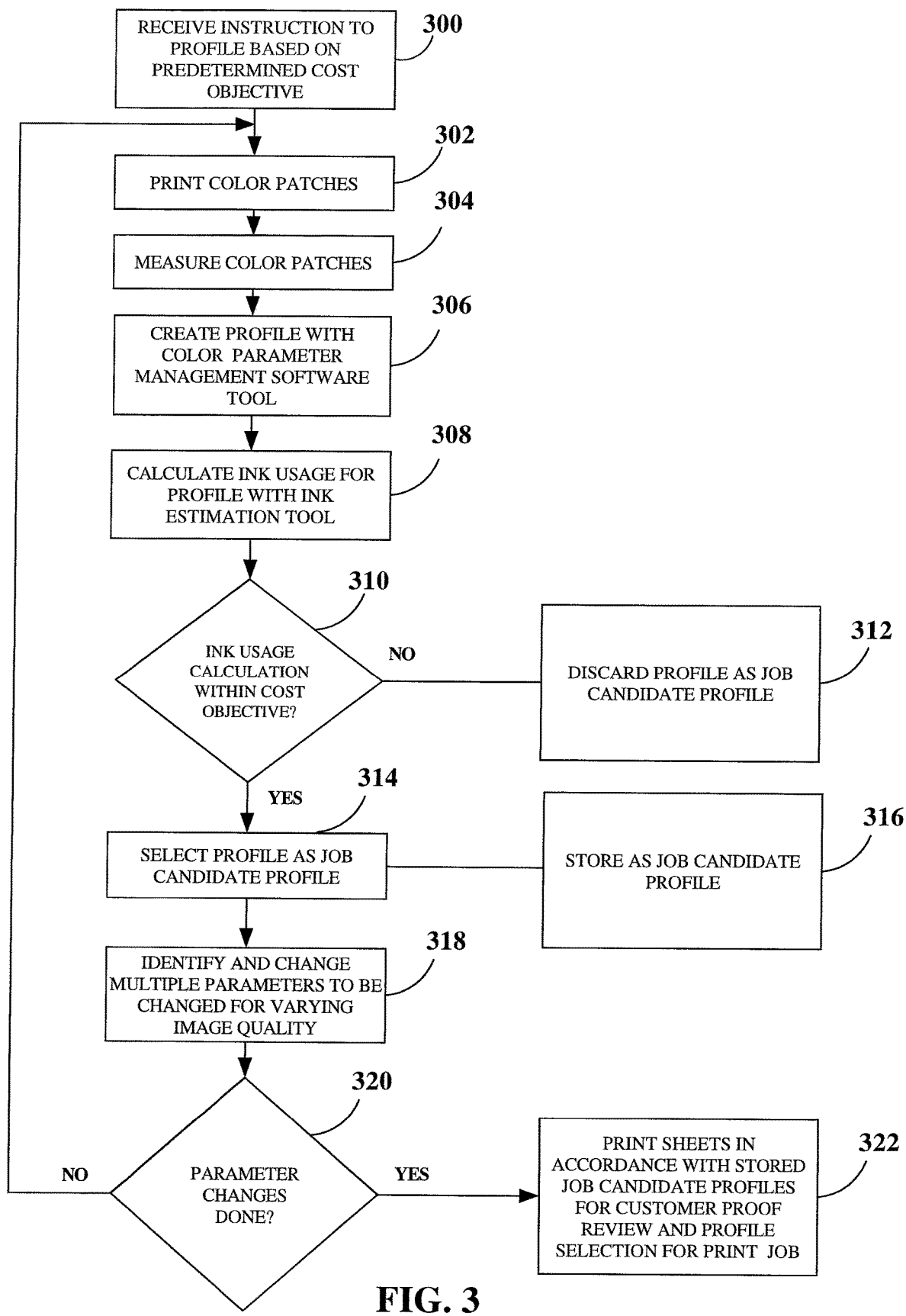
FIG. 3 is a flow diagram illustrating an example method of managing profiles in an inkjet printer system, consistent with certain disclosed embodiments.

FIG. 3 is a flow diagram illustrating an example method of managing job profiles in an inkjet printer system consistent with the present embodiments. The process begins when the system receives 300 an instruction to profile a job based on a desired or predetermined cost objective. Usually, the instruction can be based on an input by an operator using, for example, a button on a system, an input terminal that is part of and/or connected to the system, or a computing device connected to the system via direct or network connection. Given the predetermined cost objective as a threshold condition, the system will then vary job parameters that will adjust image quality, but still maintain the cost within the cost objective.

The process initially comprises printing 302 a set of standard patches (e.g., FIG. 4) on the paper that a user or customer has loaded. The patches are then scanned and measured using an in line FWA spectrophotometer for automation efficiencies (although an offline spectrophotometer can also be used) and determines that color levels are correct, that there is no more than a threshold amount of showthrough of the ink, that color contrast and/or color/paper contrasts are correct, etc. The system color management software identifies the printer parameters were that utilized in the job and thus creates the profile for that particular print job. The subject profile is then applied to ink estimation tools to calculate 308 what would be the accurate ink usage for a print job performed under the present profile (an example of such a tool is APFill https://avpsoft.com/products/apfill/). The calculated ink use is compared 310 with the predetermined cost objective and if the ink usage is not within the objective, the particular profile is discarded as a job candidate profile 312. If the profile is within the cost objective then it is selected 314 as a profile that can be used as a job candidate profile for the actual print job and is thus stored 316 as a job candidate profile.

The objective of the embodiment is to iterate the profile creation and measurement steps through color management controls by changing multiple parameters at once (UCR/GCR, total area coverage, etc.) to adjust the image quality, and then calculate the ink usage to meet the predetermined cost objectives. If the adjustment at one parameter creates a profile that results in too much ink being used, the profile is discarded and the routine continues to adjust settings to find a good combination for the customer. This optimization routine result in a series of profiles that fall in a common contour of substantial and equivalent cost.

More particularly, color management software must identify and change 318 multiple parameters to be changed for varying image quality and will continue to do so 320 until the color management software has determined that no more appropriate changes of parameters are necessary. As the parameters are changed, the process will sequentially iterate through the measurement processes and calculating beginning at printing the color patches for the particular profile 302. When all the parameter changes are deemed to have been completed, the process involves printing 322 sheets in accordance with the stored job candidate profiles for customer proof view and profile selection for the print job. The customer can thus select the image quality through an automated process which appears to best suit a particular print job, while knowing that the predetermined cost objective is maintained.

FIG. 4 is an example of a printed test sheet with multiple different colors of color patches, consistent with certain disclosed embodiments.

Printed test sheet 30 can represented a printed test sheet printed by an inkjet printer system (e.g., inkjet printer system 100 in FIG. 1) and/or a printed test sheet printed in 302 in FIG. 3. As depicted in FIG. 4, printed test sheet 30 can include rows of different color patches 31 and timing or triggering indicia marks 33. As described, and shown in FIG. 1, printed test sheet 30 can be printed and then scanned by an FWA spectrophotometer (e.g., FWA 140 in FIG. 1 or FWA spectrophotometer system 10 in FIG. 2). In various embodiments, printed test sheet 30 can be scanned to determine spectral data, which can be converted into measurements that are used to determine if color accuracy is maintained within the cost objective.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A printer processing control system for controlling print image quality comprising:
   a first user input for defining a predetermined print cost comprising ink usage cost for a print job and a desired image quality;
   a profiling tool for generating a plurality of job profiles having a variety of job print costs and corresponding image quality;
   an estimating tool comprising a spectrophotometer for measuring image quality for validating that each one of the plurality of the job profiles has a consistency with the predetermined print cost and the desired image quality, wherein the estimating tool is configured to determine if accuracy is maintained within the ink usage cost based on a test sheet including: (i) rows of different color patches, and (ii) triggering indicia marks;
   a printer for printing sheets in accordance with validated job profiles to enable selecting a one of the plurality of the job profiles having a maximum consistency with the predetermined print cost and desired image quality; and
   a second user input for selecting a profile based on a printed sheet of the printed sheets.

2. The control system of claim 1 further comprising a processor for storing validated job profiles and job candidate profiles for printing a plurality of print jobs corresponding to the job profiles.

3. The control system of claim 2 wherein the profiling tool comprises a color quality processor adjusted for adjusting selected ones of color parameters.

4. The control system of claim 3 wherein the printer comprises an ink jet printer wherein ink usage can be calculated.

5. The control system of claim 1, wherein the estimating tool is further configured to determine if a showthrough amount of ink on the test sheet is no more than a threshold amount of showthrough ink.

6. A method comprising:
   printing one or more color patches on a test sheet of paper associated with a first set of predetermined color management parameters;
   determining spectral data of the one or more color patches using a full width array spectrophotometer;
   determining measurements based on the spectral data;
   determining a first profile associated with first set of predetermined print parameters;
   determining a first cost estimation for the first profile including a calculation of ink usage;
   iterating the printing of the one or more color patches through varied color management by changing multiple ones of the print parameters to adjust image quality;
   determining other profiles for the iterative printing and other cost estimations for the profiles;
   determining that an accuracy of the first profile is not maintained within a preselected cost objective according to a test sheet including: (i) rows of different color patches, and (ii) triggering indicia marks;
   discarding the first profile in response to the accuracy not being maintained within the preselected cost objective;
   discarding any of the other profiles having a cost estimation in excess of the preselected cost objective and ink usage for forming a set of acceptable profiles that fall on a common contour of equivalent cost;
   printing a set of subsequent sheets for each of the acceptable profiles for customers' proof of image quality and selection of one of the acceptable profiles; and
   receiving a selection of the one of the acceptable profiles based on a printed sheet of the printed set of subsequent sheets.

7. The method of claim 6 wherein the discarding comprises forming the set of acceptable profiles having varied image quality, respectively.

8. The method of claim 6 wherein the changing multiple ones of the print parameters comprise changing any of UCR/GCR total area coverage, ink limits and color contrast.

9. The method of claim 6 wherein the determining the first and other cost estimations comprise estimating ink usage.

10. The method of claim 6, further comprising determining that an amount of showthrough ink on the test sheet is no more than a threshold amount of showthrough ink.

* * * * *